United States Patent
Roskey

(10) Patent No.: US 7,199,486 B2
(45) Date of Patent: Apr. 3, 2007

(54) SYSTEM AND METHOD FOR CONVERTING WIND INTO MECHANICAL ENERGY

(76) Inventor: John E. Roskey, 7456 Old Highway 395, Carson City, NV (US) 89704

( * ) Notice: Subject to any disclaimer, the term of this patent is extended or adjusted under 35 U.S.C. 154(b) by 0 days.

(21) Appl. No.: 11/104,673

(22) Filed: Apr. 13, 2005

(65) Prior Publication Data

US 2005/0242591 A1 Nov. 3, 2005

Related U.S. Application Data

(63) Continuation of application No. 10/619,732, filed on Jul. 14, 2003, now Pat. No. 6,911,744.

(51) Int. Cl.
*F03D 9/00* (2006.01)
(52) U.S. Cl. .............................. 290/55; 290/54; 60/398
(58) Field of Classification Search ................. 290/43, 290/44, 54, 55; 60/398, 675
See application file for complete search history.

(56) References Cited

U.S. PATENT DOCUMENTS

| | | |
|---|---|---|
| 3,883,750 A | 5/1975 | Uzzell, Jr. |
| 3,913,470 A | 10/1975 | Cullen |
| 3,976,244 A | 8/1976 | Logsdon |
| 4,002,023 A | 1/1977 | Hartman |
| 4,162,410 A | 7/1979 | Amick |
| 4,295,416 A | 10/1981 | Gorchev et al. |
| 4,315,415 A | 2/1982 | Wilson |
| 4,504,192 A | 3/1985 | Byrus et al. |
| 4,508,973 A | 4/1985 | Payne |
| 4,546,264 A | 10/1985 | Pinson |
| 4,582,013 A | 4/1986 | Holland, Jr. |
| 4,642,958 A | 2/1987 | Pewitt |
| 4,781,523 A | 11/1988 | Aylor |
| 4,801,811 A | 1/1989 | Assaf et al. |
| 4,909,135 A | 3/1990 | Greko |
| 4,957,037 A | 9/1990 | Tubbesing et al. |
| 5,155,992 A | 10/1992 | Follensbee et al. |
| 5,195,251 A | 3/1993 | Gyurcsek et al. |
| 5,290,200 A | 3/1994 | Kiser |
| 5,326,314 A | 7/1994 | Brockway et al. |
| 5,380,149 A | 1/1995 | Valsamidis |
| 5,391,926 A | 2/1995 | Staley et al. |

(Continued)

FOREIGN PATENT DOCUMENTS

DE 4 002 341 8/1990

(Continued)

*Primary Examiner*—Nicholas Ponomarenko
(74) *Attorney, Agent, or Firm*—Buchanan Ingersoll & Rooney PC

(57) ABSTRACT

A system for converting an airflow into mechanical energy includes a drawtube and an airflow turbine capable of converting an airflow through the drawtube into rotational mechanical energy. The drawtube includes a tubular member with first and second open ends and a substantially planar leading edge member positioned in front of the first open end. As an airflow passes over the drawtube, a reduced pressure region results adjacent to the leading edge. The reduced pressure region in combination with counter-rotating eddies, or vortices, formed by the leading edge cause air to be drawn out of the first open end of the tubular member establishing an internal airflow which drives the turbine or other energy conversion device.

31 Claims, 9 Drawing Sheets

U.S. PATENT DOCUMENTS

| | | | |
|---|---|---|---|
| 5,394,016 A * | 2/1995 | Hickey | 290/55 |
| 5,457,346 A | 10/1995 | Blumberg et al. | |
| 5,551,916 A | 9/1996 | Morse, Jr. | |
| 5,655,964 A | 8/1997 | Rheault et al. | |
| 5,709,419 A | 1/1998 | Roskey | |
| 5,711,480 A | 1/1998 | Zepke et al. | |
| 5,746,653 A | 5/1998 | Palmer et al. | |
| 5,826,383 A | 10/1998 | Garrison | |
| 5,860,858 A * | 1/1999 | Wettergren | 454/343 |
| 6,149,516 A * | 11/2000 | Mantyla | 454/359 |
| 6,239,506 B1 | 5/2001 | Roskey | |
| 6,319,115 B1 | 11/2001 | Shingaki | |
| 6,437,457 B2 * | 8/2002 | Roskey | 290/55 |
| 6,510,687 B1 * | 1/2003 | Zaslavsky et al. | 60/398 |
| 6,765,309 B2 * | 7/2004 | Tallal et al. | 290/55 |
| 6,911,744 B2 * | 6/2005 | Roskey | 290/55 |
| 7,026,723 B2 * | 4/2006 | Moreno | 290/55 |

FOREIGN PATENT DOCUMENTS

| | | |
|---|---|---|
| FR | 450 138 | 3/1913 |
| FR | 1 195 450 | 11/1959 |
| FR | 2 379 709 | 10/1978 |

\* cited by examiner

SYSTEM AND METHOD FOR CONVERTING WIND INTO MECHANICAL ENERGY

FIELD OF THE INVENTION

The invention relates to a system and method for converting an airflow into mechanical energy, and more particularly, the invention relates to a system and method for collecting wind energy and converting the wind energy into useful energy forms.

BACKGROUND OF THE INVENTION

Many wind energy collection systems have been proposed in the prior art. Classic windmills and wind turbines employ vanes or propeller surfaces to engage a wind stream and convert the energy in the wind stream into rotation of a horizontal windmill shaft. These classic windmills with exposed rotating blades pose many technical, safety, environmental, noise, and aesthetic problems. The technical problems may include mechanical stress, susceptibility to wind gusts and shadow shock, active propeller blade pitch control and steering, and frequent dynamic instabilities which may lead to material fatigue and catastrophic failure. In addition, the exposed propeller blades may raise safety concerns and generate significant noise. Furthermore, horizontal axis wind turbines cannot take advantage of high energy, high velocity winds because the turbines can be overloaded causing damage or failure. In fact, it is typical to govern conventional horizontal windmills at wind speeds in excess of 30 mph to avoid these problems. Since wind energy increases as the cube of velocity, this represents a significant disadvantage in that high wind velocities which offer high levels of energy also require that the windmills be governed.

Vertical axis turbines are also well known. Although vertical axis turbines address many of the shortcomings of horizontal shaft windmills, they have their own inherent problems. The continual rotation of the blades into and away from the wind causes a cyclical mechanical stress that soon induces material fatigue and failure. Also, vertical axis wind turbines are often difficult to start and have been shown to be lower in overall efficiency.

One alternative to the horizontal and vertical axis wind turbines described above is the airfoil wind energy collection system described in U.S. Pat. Nos. 5,709,419 and 6,239,506. These wind energy collection systems include an airfoil or an array of airfoils with at least one venturi slot penetrating the surface of the airfoil at about the greatest cross-sectional width of the airfoil. As air moves over the airfoil from the leading edge to the trailing edge, a region of low pressure or reduced pressure is created adjacent to the venturi slot. This low pressure region, caused by the Bernoulli principal, draws air from a supply duct within the airfoil, out of the venturi slot and into the airflow around the airfoil. The air supply ducts within the airfoil are connected to a turbine causing the system to draw air through the turbine and out of the airfoil slots thus generating power.

In the wind energy collection systems described in U.S. Pat. Nos. 5,709,419 and 6,239,506, the slot, or the area just aft of the leading edge and prior to the tubular section, was a low pressure area used for drawing air out of the airfoil. However, it has been found that the draw was developed by only a small portion of the slot, that coinciding with the very beginning of longitudinal opening on the tubular member. Therefore, the goal seemed to be a wider opening. However, as the opening was enlarged, the performance dropped off after the size of the opening reached a width equal to or greater than the width of the leading edge. Accordingly, this established a limit on the size of the opening.

Accordingly, it would be desirable to provide a wind energy collection system with non-moving wind contacting parts, which provides improved efficiency and a stronger, simpler construction.

SUMMARY OF THE INVENTION

The present invention relates to a wind energy collection system constructed from one or more airfoils with substantially stationary wind contacting surfaces, a substantially flat leading edge and a scoop for improved efficiency.

In accordance with one aspect of the invention, a system for converting an airflow into mechanical or electrical energy includes a tubular member, the tubular member having a first opening and a second opening, the first and second openings formed in two planes substantially perpendicular to a longitudinal axis of the tubular member; a substantially planar leading edge member positioned on windward side of the first opening; and an energy conversion device configured to convert an airflow through the tubular member into mechanical or electrical energy.

In accordance with another aspect of the invention, a system for converting an airflow into mechanical or electrical energy includes a drawtube and an energy conversion device configured to convert an airflow through the drawtube into mechanical or electrical energy. The drawtube includes a tubular member with a circular cross-section, the tubular member having a first opening and a second opening, the first and second openings formed in two planes substantially perpendicular to a longitudinal axis of the tubular member; a substantially planar leading edge member positioned on a windward side of the first opening; and a scoop member positioned on an opposite side of the second opening from the leading edge member, wherein the substantially planar leading edge member and the scoop member are in two planes which are substantially parallel to the longitudinal axis of the tubular member.

In accordance with a further aspect of the present invention, a system for converting wind into mechanical or electrical energy including a drawtube and an energy conversion device configured to convert the airflow through the drawtube into mechanical or electrical energy. The drawtube includes a tubular member having a longitudinal axis, an inside, an outside, a first open end and a second open end; and a leading edge positioned adjacent to the outside of the first open end of the tubular member configured to create a pressure differential within the tubular member when wind blows past the drawtube generating an airflow within the tubular member.

In accordance with another aspect of the present invention, a method for collecting wind energy includes the steps of: providing a drawtube comprising a tubular member having a pair of openings extending perpendicular to a longitudinal axis of the tubular member and a substantially planar leading edge member positioned in front of one of the openings; positioning the drawtube in the wind with the substantially planar leading edge member facing into the wind; passing wind around the substantially planar leading edge member, the airflow creating eddies in and around the tubular member and the substantially planar leading edge member; creating an airflow within the tubular member; and converting the airflow to mechanical or electrical energy.

The present invention provides the advantages of improved efficiency and improved structural strength in a system for converting an airflow into mechanical energy with substantially stationary wind contacting surfaces.

BRIEF DESCRIPTION OF THE DRAWINGS

The invention will now be described in greater detail with reference to the preferred embodiments illustrated in the accompanying drawings, in which like elements bear the reference numerals, and wherein.

DETAILED DESCRIPTION

This invention provides a system for converting an airflow into mechanical energy with non-moving wind contacting parts and which provides improved efficiency with a stronger, simpler construction.

Figure 1:
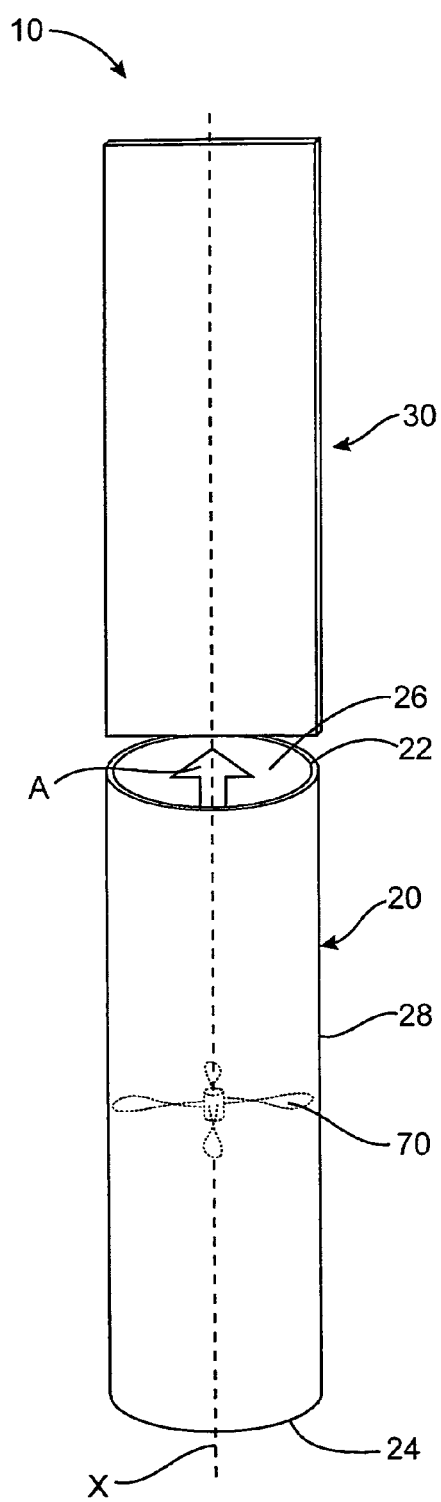
FIG. 1 is a perspective view of a system for converting an airflow into mechanical energy in the form of a simple drawtube.

FIG. 1 shows a drawtube 10 for converting an airflow into mechanical energy having a tubular member 20, a substantially planar leading edge member 30, and an energy conversion device 70. The wind in FIG. 1 is assumed to be coming out of the page. The energy conversion device 70 may be positioned within the tubular member 20 as shown in FIG. 1 or connected to the drawtube 10 by an air plenum. The tubular member 20 has a first opening 22 and a second opening 24 formed in two planes substantially perpendicular to a longitudinal axis X of the tubular member. The substantially planar leading edge member 30 is positioned in front of or on the windward side of the first opening 22. The leading edge member 30 in the embodiment of FIG. 1 is in a plane which is substantially parallel to the longitudinal axis of the tubular member 20, however, the leading edge may also be canted aft as will be described further below.

The tubular member 20 has a circular cross-section; however, it can be appreciated that the tubular section can be oval, rectangular, or otherwise shaped without departing from the present invention. The substantially planar leading edge member 30 (or leading edge) causes a deep low static pressure region to be formed adjacent to the first opening 22 of the tubular member 20. This low pressure region causes air to be drawn through the tubular member 20 in the direction of the arrow A.

In order to increase the opening size of the wind energy collection systems as described in U.S. Pat. Nos. 5,709,419 and 6,239,506 without also incurring the width-related performance penalty, the opening 22 was placed at substantially 90 degrees to the leading edge 30. This led to the minimal design of the simple drawtube 10 of FIG. 1 consisting of the tubular member 20 with a circular end opening 22 and a substantially planar member 30 (or leading edge) installed next to one opening 22. The bottom opening 24 of the tubular member 20 can be connected to an air plenum (not shown), wherein the air plenum connects the drawtube 10 to others, and/or to a mechanical-to-electrical energy conversion device.

In operation, the system 10 of FIG. 1 functions based on the generally known principle that within a system, the total pressure in the air is equal to a constant. In addition, the total pressure is also equal to the sum of the dynamic, static, and potential pressure components. In this case, the potential pressure component remains constant. Accordingly, if the dynamic component, or the air velocity varies, the static component, or the absolute or gauge pressure, must vary by an equal and opposite amount, i.e., $$P_{TOTAL} = P_{DYNAMIC} + P_{STATIC} = C$$

where
$P_{TOTAL}$ is the total pressure,
$P_{DYNAMIC}$ is the dynamic pressure, and
$P_{STATIC}$ is the static pressure.

In the case of the present invention, the substantially planar leading edge member 30 (or leading edge) accelerates the airflow (i.e., wind) at a point adjacent to an edge of the substantially planar leading edge member 30. Velocities in this region can be many times greater than the ambient winds. Accordingly, since the total pressure must remain constant, the very high velocities also mean very low static pressures adjacent an edge of the leading edge 30.

One of the particular advantages of the design of the present invention is that in using a closed system, the user can benefit from both the static and dynamic components of the airflow. An open-air turbine of conventional design, for example, can only harvest the dynamic pressure component as the static pressure differentials dissipate into the open air. This is further compounded by the fact that the local air velocity is slowed substantially, by no less than about one-third, before it ever reaches an open-air or conventional wind turbine. The effect of slowing the approaching wind reduces the amount of energy that a wind turbine can capture to an absolute maximum described by the Betz limit. Generally, it is acknowledged that all flat-plate bodies in the wind slow the oncoming air velocity to about two-thirds (⅔) of the original velocity. Although the present invention is also restricted by the Betz limit, a drawtube does increase the energy density through the energy conversion device by collecting energy across its overall flat-plate area.

Using traditional designs for wind turbines, the only way to increase the amount of energy presented to the turbine at a given wind speed, is to increase the area, or the diameter of the propeller. To reach a fivefold increase in energy, for example, one would have to increase the propeller diameter by 2.236 times, since the area of the propeller increases with the radius squared. In the real world of mechanical stress and strain, not to mention clearance issues, gyroscopic forces, teetering, and all the other issues of large, open air props, such increases can be impractical.

In addition to differential pressures, strong leading edge vortices formed adjacent to the edges of the substantially planar leading edge member 30 also play a part in increasing the ability of the system to generate energy. The leading edge vortices are tubular in nature, and rotate in opposite directions, i.e., backwards with the wind and inwards toward the area behind the center of the substantially planar leading edge member 30. This strong rotational flow also helps to trap, entrain and draw along the airflow from within the outlet opening 22 of the tubular member 20. When the system 10 is canted with the leading edge member 30 at about 33 degrees aft, these vortex tubes stay substantially fixed in position, thus increasing the performance. In a preferred embodiment the tubular member 20, leading edge 30, are both canted at about 33 degrees. However, each of these members can be canted individually to achieve some of the benefits. The substantially planar leading edge member 30, being slightly less in width than the diameter of the tubular member 20, places the high velocity vortex tubes in optimal position with respect to the circular tubular member 20 outlet opening 22.

An aspect ratio, or height to width ratio of the entire drawtube, of about 6 to 1 is desirable because it allows a high velocity flow over a "bluff body" airfoil, which in turn creates high velocity vortices off the substantially planar leading edge member 30. In addition, when the tubular member 20 is tubular, or cylindrical, it affords the lowest friction solution to moving air within an enclosed, or interior, volume. It also presents a "bluff body" cross-section to the wind, which encourages strong vortex formation.

As shown in FIG. 1, the wind energy system 10 includes the tubular member 20, the substantially planar leading edge member 30, and the energy conversion device 70 for converting the airflow into rotational mechanical energy. The second opening 24 of the tubular member 20 is configured to form an air plenum. For the purposes of this application, the air plenum can be of any length and/or configuration and is thought of simply as an enclosed air passageway connecting the low static pressure regions of the system 10 to a higher static pressure region, which may be either the outside air or an increased static pressure region formed by the action of one or more scoops (shown in FIG. 2). The air plenum in the example of FIG. 1 begins with the low pressure region adjacent to the substantially planar leading edge member 30 and extends through the tubular member 20 of the drawtube 10 to the second opening 24.

The energy conversion device 70 is placed in the air plenum and converts the mechanical energy of a rotating turbine to electrical energy or other energy. Although the energy conversion device 70 has been shown within the tubular member 20, it may also be placed at a remote location as illustrated in U.S. Pat. Nos. 5,709,419 and 6,239,506 which are incorporated herein by reference in their entirety.

In operation, the substantially planar leading edge member 30 is positioned on the windward side of the tubular member 20 or in front of the tubular member. When an airflow, for example, a gust of wind blows past the substantially planar leading edge member 30, the area adjacent the first opening 22 of the tubular member 20 is at a low pressure compared with the air pressure outside of the second opening 24 of the tubular member 20. This pressure difference causes air from within the tubular member 20 to flow out of the tubular member 20 through the first opening 22.

According to one example, the substantially planar leading edge member 30 is a plate-shaped member having a height which is about equal to a height of the tubular member 20, and a width which is about equal to or slightly less than the width of the opening 22. The substantially planar leading edge member 30 is as thin as is structurally possible. For example, the planar leading edge may have a thickness of between about $1/2400$ to about $1/16$ of the height of the substantially planar leading edge member 30.

Figure 2:
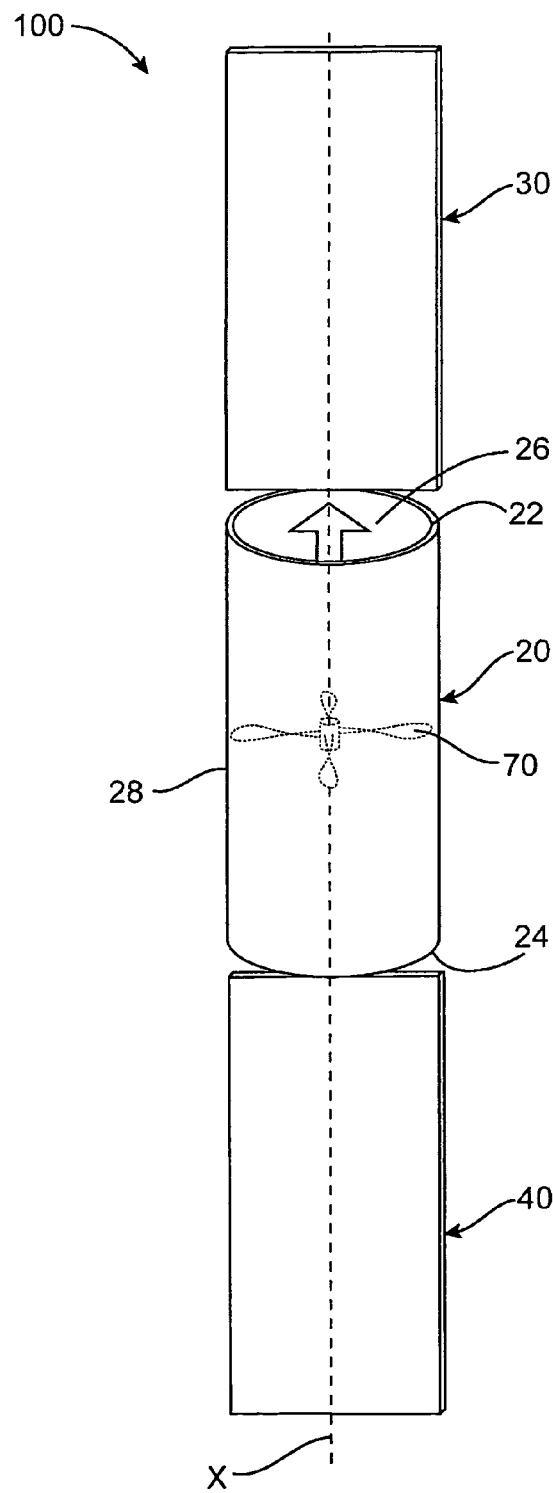
FIG. 2 is a perspective view of an alternative embodiment of the system for converting an airflow into mechanical energy in the form of a compound bidirectional drawtube.

In another embodiment as shown in FIG. 2, a compound drawtube 100 includes the tubular member 20, the substantially planar leading edge member 30, the energy conversion device 70, and a scoop member 40. The wind in this embodiment is assumed to be coming out of the page. However, the drawtube 100 also operates with wind going into the page.

In order to maximize performance, or the flow of air within the tubular member 20 and/or plenum, an opposing, high pressure region can be created. It has been shown that an increased positive pressure gradient is created by a scoop member 40, shown in FIG. 2. The placement of the scoop 40, if used, is at opposite ends of the tubular member 20, with the energy conversion device placed within the tubular member and between the low pressure region of the drawtube adjacent the leading edge 30 and the high-pressured region adjacent the scoop 40.

The scoop member 40 (or scoop) causes an increase in static pressure by converting the dynamic component of the wind energy (dynamic pressure) in close proximity to the second opening 24 of the tubular member 20 to static pressure. The increase in the local static pressure at the second opening 24 and the low static pressure at the first opening 22 creates high velocity airflow through the interior of the tubular member 20 and through the turbine of the energy conversion device 70.

The present invention operates through the acceleration and deceleration of the wind, or airflow, based on the Bernoulli theory. It creates two dissimilar regions, one of high velocity, low static pressure and one of low velocity, high static pressure, and then connects the two in a controlled environment. The vortices carry high velocity air backwards and inwards to interact with the wide circular outlet opening 22 on the tubular member 20. The lowest velocity air is created at the center of a blunt surface, such as the interface between the scoop member 40 and the tubular member 20 inlet opening 24. This interface is located at the lateral centerline of the scoop member 40 to take advantage of the lowest velocity air.

The compound drawtube 100, as shown in FIG. 2, is a bidirectional system wherein both the substantially planar leading edge member 30 and the scoop member 40 can function as either the leading edge or the scoop depending on the direction of the approaching wind. As shown in FIG. 2, if the wind or airflow were coming from the direction of the observer, the scoop member 40 would assume the role of the leading edge. Meanwhile, the substantially planar leading edge member 30 would assume the role of the scoop. Conversely, if the wind or airflow were coming from the opposite direction, the substantially planar leading edge member 30 would become the leading edge, and the scoop member 40 would be the scoop. In most bidirectional systems the substantially planar leading edge member 30 and scoop member 40 have a substantially similar design.

The leading edge is generally defined as a substantially planar member positioned on the windward side or in front of the tubular member 20. The leading edge member 30 is positioned adjacent to the outside of the first open end 22 of the tubular member 20. Meanwhile, the scoop is generally defined as a substantially planar member positioned on the leeward side or in back of the tubular member 20. The scoop 40 is positioned adjacent to the outside of the second open end 24 of the tubular member 20. The tubular member 20 is configured to create a pressure differential within the tubular member when wind blows past the compound drawtube 100 generating an airflow within the tubular member. As discussed above with respect to FIG. 1, the energy conversion device may alternately be located outside of the drawtube 100 and connected by air passages.

Figure 3:
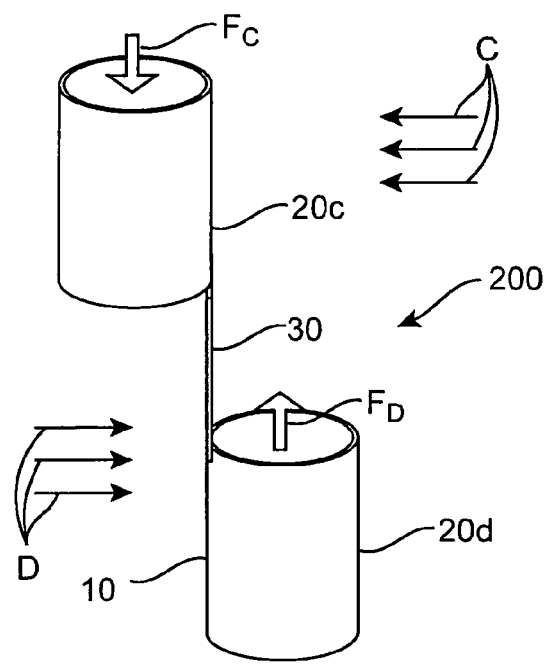
FIG. 3 is a perspective view of another configuration of a compound bidirectional drawtube according to an alternative embodiment.

FIG. 3 illustrates an alternative embodiment of a compound bidirectional drawtube 200 having two tubular members 20 and one rectangular leading edge member 30 which operates with one of the tubular members depending on the direction of the wind. The leading edge 30 also acts as a scoop with the other tubular member thus increasing the pressure differential and, ultimately, the airflow within the tubular members 20c and 20d. In the embodiment of FIG. 3, when the wind is blowing in the direction of the arrows C, the planar leading edge 30 operates in combination with the tubular member 20c to create an airflow in the direction $F_C$ through the tubular member 20c. The leading edge 30 also operates as a scoop for the tubular member 20d when the airflow is in the direction C. When the airflow is in the direction of the arrows D, the leading edge 30 operates as a leading edge in combination with the tubular member 20d to create an airflow in the direction $F_D$ through the tubular member 20d and operates as a scoop for tubular member 20c. One difference between the drawtube 100 of FIG. 2 and the drawtube 200 of FIG. 3, is that the compound drawtube of FIG. 2 is better suited for an internal energy conversion device or embedded drawtube, whereas the compound drawtube of FIG. 3 is better suited (but not limited to) for a plenum mounted energy conversion device, such as you might see in an array.

Figure 4:
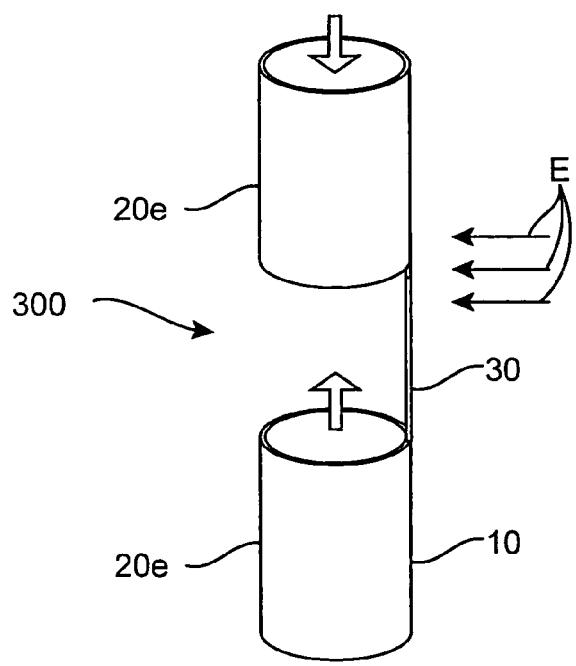
FIG. 4 is a perspective view of one configuration of a unidirectional compound drawtube according to another embodiment.

FIG. 4 illustrates an alternative compound drawtube configuration with two tubular members 20e interconnected by a planar leading edge 30. When the wind blows from the wind direction E the planar leading edge 30 operates as a leading edge for both of the tubular members 20e and the airflow through the tubular members 20e is as shown. If the wind is in the opposite direction, the planar leading edge 30 becomes a scoop and the airflow direction is reversed. As in the single direction drawtube 10 of FIG. 1, the single direction drawtube 300 of FIG. 4 may be mounted on a rotation mechanism for allowing the drawtube to rotate so that the planar leading edge 30 faces into the wind. The rotatable support structure for rotating the drawtubes may be any of those which are known to those in the art.

The Tubular Member

Figure 8A:
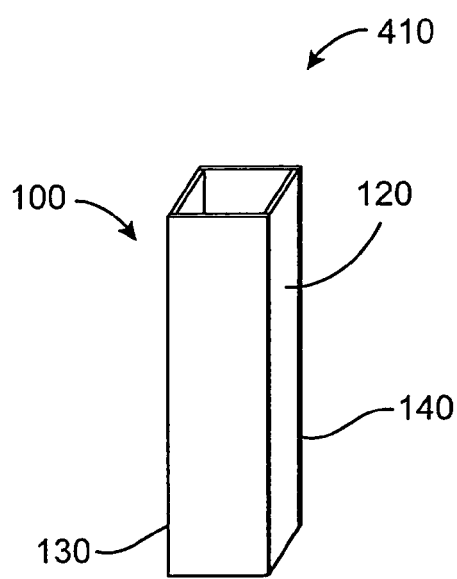
FIGS. 8A and 8B are perspective views of an alternative embodiment of a compound drawtube with sliding plates.
Figure 8B:
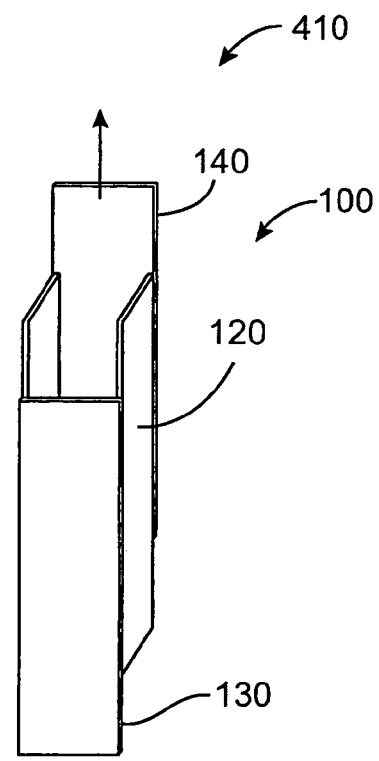

As shown in FIGS. 1 and 2, the tubular member 20 has a circular cross-section. However, the tubular member 20 can be slightly oval, or composed of planar sections with connecting angles in an approximation of a circular cross-section (as shown in FIGS. 8A and 8B). The performance should increase as the drawtube approximates a cylinder. In addition, it can be appreciated that other shapes and configurations of the tubular members can be used.

As shown in FIGS. 1 and 2, the tubular member 20 has an interior surface 26 and an exterior surface 28. In one embodiment, the interior surface 26 of the tubular member 20 is smooth and as free as possible from obstructions of any sort. If any obstructions are required, they are preferably oriented longitudinally, not laterally, or cross-flow. The exterior surface 28 of the tubular member 20 is also smooth. If exterior obstructions are required, the obstructions are preferably lateral rather than longitudinal.

The Drawtubes

The size and shape of the drawtubes 10, 100, 200, 300 as shown in FIGS. 1–4, are based on the availability of aerodynamic propellers, generators, local ordinances and covenants (including height restrictions), and ease of installation and maintenance. However, it can be appreciated that the drawtubes 10, 100, 200, 300 can be constructed to almost any dimension. In other words, the aerodynamic performance remains predictable as the size of the drawtubes 10, 100, 200, 300 increase until the point where the wind speed off the substantially planar leading edge member 30 approaches the speed of sound. In addition, as the size of the drawtubes 10, 100, 200, 300 decreases, the performance characteristics remain the same as long as turbulent flow is possible.

In one embodiment, the simple drawtube 10 of FIG. 1 has a height to width ratio of about six-to-one (i.e., the total height of the drawtube 10, including the tubular member 20 and the substantially planer leading edge member 30). When three components, two tubular members and one substantially planar member (FIG. 3), or one tubular member and two substantially planar members (FIG. 2), are combined, the system forms a compound drawtube. In each case, simple or compound, the resulting aerodynamic system can have an aspect ratio of about 6:1. Additionally, each component should approximate the aspect ratio of each other component in the system. For instance, in a simple drawtube, the two components can each have an aspect ratio of about 3:1. In the compound drawtube however, each component would have an aspect ratio of about 2:1.

Although drawtube aspect ratios of about 6:1 have been described, it can be appreciated that other ratios can be used. For example, height to width ratios of about 2:1 to about 100:1 can be used. Preferably a height to width ratio of about 4.5:1 to about 10:1 is used. The length of each section (i.e., the tubular member 20, the substantially planar leading edge member 30 and the scoop member 40) is about equal in length.

The Leading Edge and Scoop

The substantially planar leading edge member 30 and the scoop member 40 are generally rectangular shaped planar members. However, it can be appreciated that other shapes can be used including square, oval, or other shapes that provide a leading edge vortex. In addition, the substantially planar leading edge member 30 and the second planar member 40 are as thin as possible, unobstructed, and straight. In one embodiment, the substantially planar leading edge member 30 is substantially flat. However, it can be appreciated that the substantially planar leading edge member 30 can have a curved or angled surface for increased structural strength and for rotating the system to face the wind. The lateral width of the substantially planar leading edge member 30 and the scoop member 40 can be slightly less than the diameter of the tubular member. In one embodiment, the lateral width of the substantially planar leading edge member 30 and the scoop member 40 are about $13/16$ of the diameter of the main body of the tubular member 20.

The longitudinal length of the substantially planar leading edge member 30 and the scoop member 40 should be tied to the aspect ratio (i.e., longitudinal length to lateral width) of the overall drawtube 10, 100, 200, 300. Each part of the drawtube 100, including the substantially planar leading edge member 30, the scoop member 40, and the tubular member 20, can be about one-third of the overall length of the drawtube 100. Accordingly, if the drawtube 100 has a ratio of six-to-one, the longitudinal length of each part of the drawtube 100 would be about one-third of the total length of the drawtube 100, or two times the diameter of the tubular member 20. The substantially planar leading edge member 30 can be almost any size and can be formed in a variety of different shapes.

Figure 5:
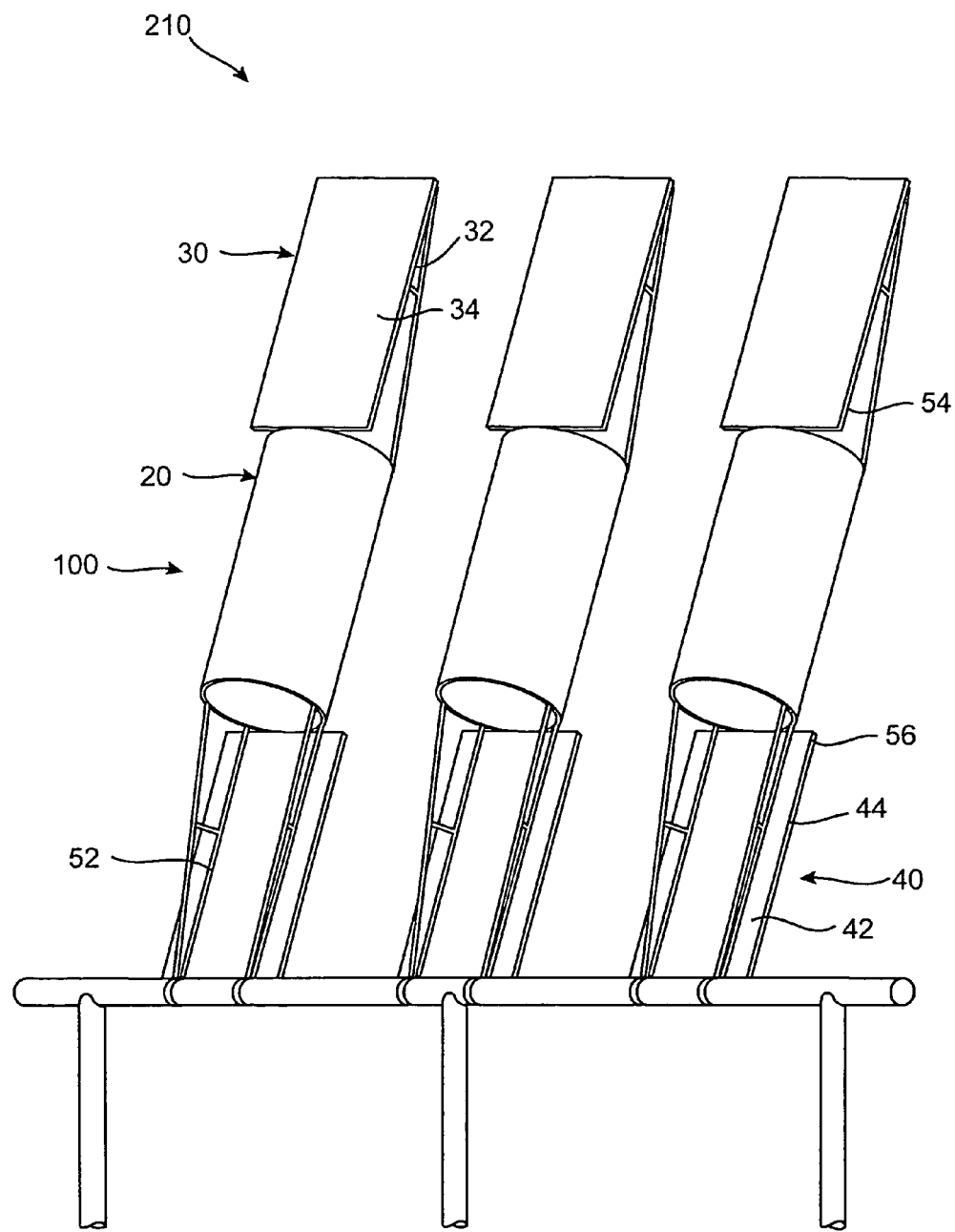
FIG. 5 is a perspective view of a panel of three compound bidirectional drawtubes according to the present invention.

As shown in FIG. 5, the substantially planar leading edge member 30 and the scoop member 40 have an interior surface 32, 42 and an exterior surface 34, 44, respectively. The exterior surfaces 34, 44 face away from the tubular member 20. Meanwhile, the interior surfaces 32, 42 face toward the tubular member 20.

In one embodiment, the exterior surface 34 of the substantially planar leading edge member 30 (leading edge) does not have longitudinal obstructions. However, if longitudinal obstructions are used such as for support members, they preferably are not placed near an edge of the substantially planar leading edge member 30. In addition, the interior surface 32 of the substantially planar leading edge member 30 preferably does not have longitudinal obstructions near the edges either. The interior surface 32 of the substantially planar leading edge member 30 is flat; however, it can be curved or shaped otherwise.

The scoop member (scoop) 40 is either curved or flat. For bidirectional drawtubes 100, 200 as shown in FIGS. 2 and 3, without design restrictions other than performance, both the scoop member 40 and the substantially planar leading edge member 30 are substantially flat, since both will alternate roles as the leading edge and scoop. In addition, the interior surface 42 of the scoop member 40, (i.e., the side facing the drawtube 100) is preferably free of obstructions. If obstructions are used, such as for support members, on the side facing the drawtube 100, they can be arranged longitudinally if possible and kept away from the edges. As shown in FIG. 5, a smooth exterior surface can be achieved by placing longitudinal supports 52 on the interior surfaces 32, 42 of the substantially planar leading edge 30 and the scoop member 40.

The substantially planar leading edge member 30 is substantially rectangular in shape. In addition, the scoop member 40 is substantially rectangular for the bidirectional drawtubes of FIGS. 2 and 3, and has the same shape as the substantially planar leading edge member 30. However, it can be appreciated that other shapes can be used.

In one embodiment of the present invention, the substantially planar leading edge member 30 and the scoop member 40 are attached directly to the first and second openings of the tubular member 20. The substantially planar leading edge 30 and the scoop member 40 have a longitudinal and lateral width wherein the longitudinal length is greater than the lateral width creating a long edge and a short edge. The tubular member 20 is connected to a middle portion of the short edge of the substantially planar leading edge member 30 and the scoop member 40. The windward side of the transition between the substantially planar leading edge member 30 and the scoop member 40 to the tubular member 20 is smooth without air gaps. In addition, an outside lateral edge 54, 56 of the substantially planar leading edge member 30 and the scoop member 40, respectively, are not fared into the tubular member 20. Rather, the outside lateral edges 54, 56 are free to contact the wind.

The drawtubes 10, 100, 200 are preferably placed on an inclination from about 0 degrees aft to about 60 degrees aft, and more preferably about 33 degrees aft (away from the wind). In other words, the plane of the leading edge 30, the axis of the tubular member 20, and the plane of the scoop 40 are all angled at an angle of about 33 degrees to the vertical with the free end of the leading edge positioned aft and the free end of the scoop forward.

In operation, the "performance to angle of inclination" curve climbs smoothly from about one, or the reference point for a drawtube 10, 100, 200 with the drawtube parallel to, and facing into the wind, to perpendicular, to a peak at about 33 degrees aft (at twice the performance of perpendicular), and then drops back down crossing the same level as perpendicular at about 45 degrees aft and then continues downward back toward reference when the drawtube 10, 100, 300 is, once again, parallel to the wind.

Energy Conversion Devices

The energy conversion device 70 is used to convert the airflow (i.e., wind) into mechanical energy (rotational, pneumatic, etc.) and/or electrical energy. In one embodiment, the energy conversion device 70 is an airflow turbine positioned within the tubular member 20. However, it can be appreciated that the energy conversion device 70 can be any type of conversion device known to one skilled in the art that can be used to convert the airflow into mechanical energy. For example, the energy conversion device 70 can be a rotational mechanical to electrical energy converter, a device which utilizes the pneumatic pressure differentials between the high and low static pressure regions, such as a jet pump or venturi nozzle, or a device which transfers the mechanical energy of a rotating propeller to a mechanical device outside the drawtube.

The energy conversion device may be located remotely and connected to the drawtube 10, 100, 200, 300 by a system of air passageways or air plenums. The remotely located energy conversion device may be a turbine, jet pump, or the like connected to one or more drawtubes by air passages. The energy conversion device may convert wind to mechanical energy, electrical energy, or a combination thereof. The mechanical energy created may include rotation of a propeller or turbine blade, a high velocity airflow, or other mechanical energy. The mechanical energy may be used directly or used to generate electrical energy.

In an alternative embodiment, the system uses an aerodynamic propeller to collect and convert the airflow into rotational mechanical energy. The mechanical energy is then converted through an electrical generator into electrical energy.

The energy conversion device 70 or aerodynamic propeller/generator is placed at the center of the tubular member 20, or within the air plenum and between the drawtube induced low-pressure region and the scoop member 40. However, it can be appreciated that other locations can be chosen without departing from the present invention.

For a bidirectional drawtube 100, 200 as shown in FIGS. 2 and 3, the energy conversion device 70 will produce power with airflow in either direction. For example, an aerodynamic propeller with a low camber, and a generator capable of producing power in either rotational direction can be chosen. In another embodiment, a permanent magnet generator/alternator passing through a bridge rectifier can be employed.

As shown in FIG. 2, the air plenum containing the energy conversion device 70 is generally confined to the tubular member 20 of the drawtube 100. For FIG. 3, the energy conversion device 70 is generally located outside of the drawtube 200 in an air passageway connected to the drawtube. Generally, the drawtubes 100 will have a wider angle of efficacy when placed vertically. Although the invention has been illustrated with the drawtubes 100 positioned vertically, the drawtubes can be positioned horizontally or at any other angle.

Arrays of Drawtubes

An array can be any plurality of the drawtubes 10, 100, 200, 300 described above or any combination thereof. The arrays described herein are merely some of the possible array arrangements.

Figure 6:
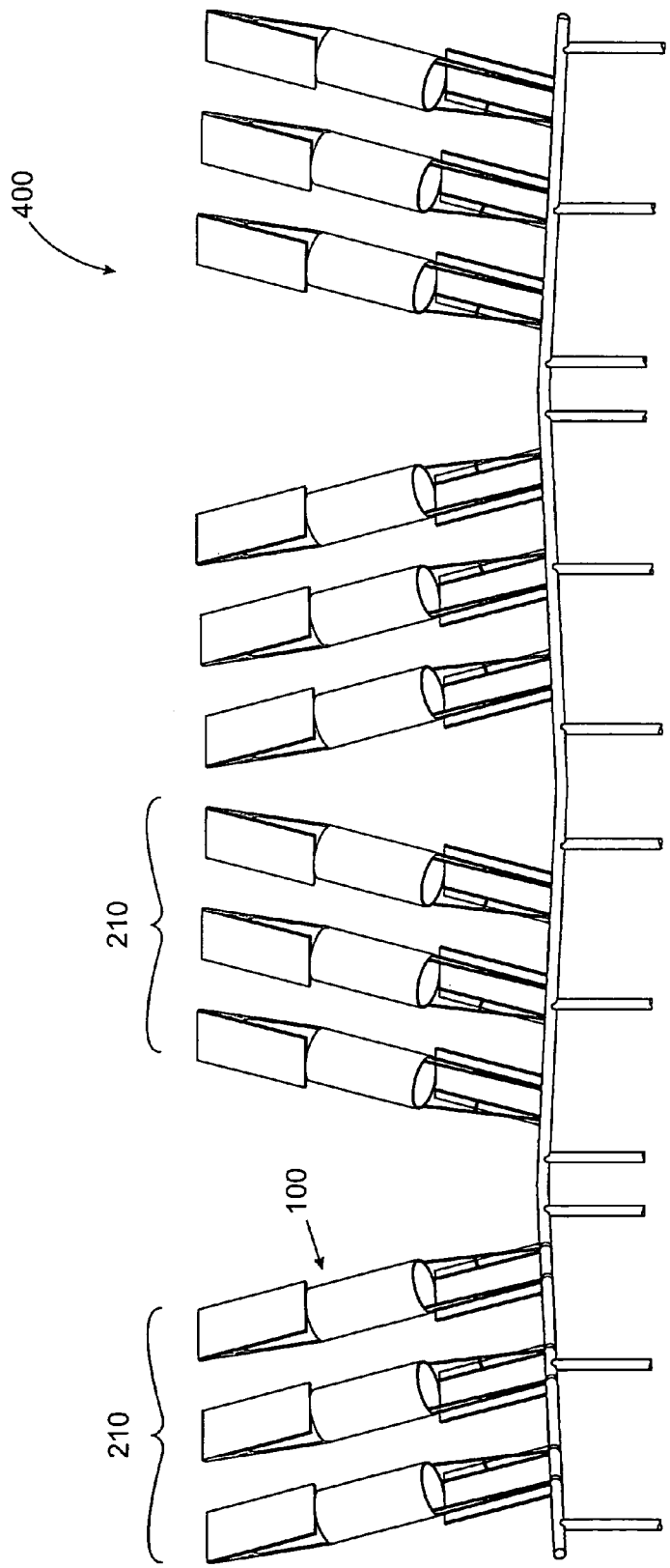
FIG. 6 is a perspective view of an array of the system for converting an airflow into mechanical energy according to the invention.

FIG. 6 shows a plurality of drawtubes 100 for collecting energy such as those shown in FIG. 2 configured in a fixed, fence-like, or lateral array 210. The fence-like array 200 is preferably constructed perpendicular to the predominant winds.

Although the possible variations of arrays are endless, the increased performance of the drawtubes 10, 100, 200, 300 by a variation of arrays is unique to this design. As shown in FIG. 6, the fence-like array 400 is constructed in a fence-like fashion, composed of connecting sections, or panels 210. Each panel 210 of three drawtubes 100, four of which are shown in FIG. 6, support a plurality of drawtubes 100. In FIG. 6, the panels 210 shown are angled at about 30 degrees with respect to the adjacent panels. In this embodiment, the "fence-like" array 400 zigzags across the ground for increased stability. In operation, each panel 210 of three drawtubes 100 produces about 500 watts, yielding a total of about 2 kW for an array of four panels 210. In addition, each array 200 is designed to be modular, such that a customer can simply add as many panels 210 as required to meet the desired level of output power.

The panels 210 have a space between drawtubes 100 of about one to three times the diameter of the drawtubes 100. This increases the output of each drawtube. The optimal spacing between drawtubes is about 1.25 diameters. This fence array is just an example of the many possible types of arrays. The array 200 creates an air passageway that accelerates the airflow between the drawtubes 100, thus increasing the performance and output of each individual drawtube 100, and hence the array 200.

Generally, the substantially planar leading edge member 30 and scoop member 40 are placed perpendicular to the wind. In other words, the flat surfaces of the substantially planar leading edge member 30 and scoop member 40 face into the wind. However, when winds are as much as 45 degrees to either side of perpendicular, an array 200 of drawtubes 100 can function at close to full power. Typically, an array 200 of drawtubes 100, can produce rated power for incoming winds that fall within two triangular regions, 90 degrees wide, on each side of the array 200. In most favorable sites, there are prevailing wind patterns in opposed directions, for example onshore and offshore breezes.

Although an array of the drawtubes 100 of FIG. 2 have been illustrated in FIG. 6 many other array configurations may be used. The leading edge 30 and/or scoop member 40 may not be in a one-to-one ratio with the number of tubular members 20. For example, in an alternative embodiment, a system can use a single substantially planar leading edge member 30 to serve a plurality of tubular members 20.

In FIG. 3, the substantially planar leading edge member 30 and the scoop member are combined into one surface. In other words, the substantially planar leading edge member 30 and the scoop member 40 are simultaneously both the leading edge for one tubular member 20c and the scoop for the other tubular member 20d. Thus, when the wind direction changes, the roles of the combined substantially planar leading edge member 30 and the scoop member 40 change. An array of the drawtubes 10 of FIG. 1 may be assembled end-to-end, or longitudinally, in this same fashion using one leading edge and/or scoop between every two tubular members.

In addition, the linear arrangement as shown in FIG. 4, or the staggered arrangement as shown in FIG. 3, wherein the leading edge and/or scoop shares a surface with its two neighboring tubular members, also decreases the cost of materials. Each of these choices, as example models of array connectivity, offers its own advantages and may be better suited to different conditions in the field. In addition, it can be appreciated that an array of drawtubes can be constructed with two sets of features, those inherent to a lateral array, and those inherent to a longitudinal array, by combining both designs into one array.

However, it can be appreciated that the array need not be linear or staggered. For example, the outline of the array can be curved or in a circular fashion. In addition, as long as the distance between tubular members 20 is equal to or more than about seven times their diameter, the tubular members 20 can be placed downwind of other tubular members 20 in the same array, as in a circular lateral array. For example, a three-dimensional version of a circular array can be a spherical or hemispherical array. This would involve tubular members 20 in arrays in both the lateral and longitudinal directions, and would look like the frame of a geodesic dome.

The tubular members 20 are generally placed vertically in arrays. However, it can be appreciated that in an alternative embodiment, at least two tubular members 20 can be arranged horizontally and assembled together in an end-to-end fashion in an array. Then at least two tubular members 20 share a substantially planar leading edge member and/or scoop member.

In an alternative embodiment, a plurality of smaller drawtubes 10, 100, 200, 300 can be implemented instead of a single drawtube 10, 100, 200, 300 if the overall height of a wind system is a concern. The plurality of drawtubes 100 can be arranged either in a vertical or horizontal arrangement, wherein the total or sum of the electrical or mechanical energy product of the smaller drawtubes 100 in the array can equal the total power of a single drawtube 100 having substantially larger dimensions, without incurring the dimensional penalties of the single, larger drawtube 100.

In addition, it is often found that a plurality of smaller drawtubes 100 is also easier to manipulate than a single, larger drawtube 100. It can also be appreciated that the drawtubes 100 can be designed so that each drawtube 100 can be easily lowered for maintenance or inspection. Generally, there is no limit to the size or number of drawtubes 100 included in an array and the number of drawtubes 100 will depend on the overall objectives and the availability of materials. For example, a plurality of very small drawtubes 100, formed from extruded aluminum, can be a practical solution in a mesh-like or a chain link fence array.

Movable Systems

Figure 7:
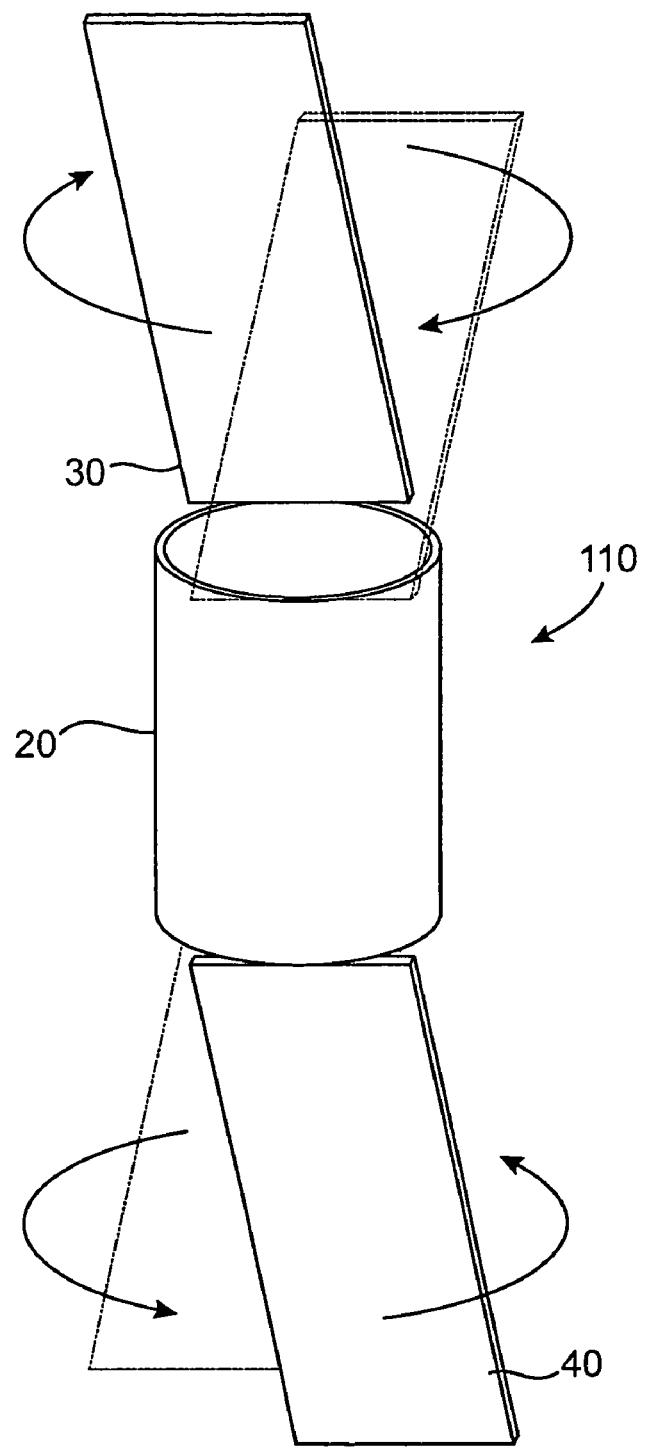
FIG. 7 is a perspective view of an alternative embodiment of an omni-directional compound drawtube with a rotating leading edge and scoop.

As described above, in one embodiment the substantially planar leading edge member 30 and scoop member 40 are perpendicular to the prevailing wind or airflow. However, if the wind directions are not consistent, an alternative embodiment as shown in FIG. 7 can be implemented. As shown in FIG. 7, a single compound drawtube 110 is constructed in a fixed position. In this embodiment, the substantially planar leading edge member 30 and the scoop member 40 rotate independent of the tubular member 20 to face into the wind. The substantially planar leading edge member 30 and the scoop member 40 are rotated utilizing either a motorized linkage, or through aerodynamic means by placing the centers of aerodynamic pressure for the scoop and the leading edge aft of the pivot points. In this embodiment, the scoop member 40 and the substantially planar leading edge member 30 do not serve as both a scoop and a leading edge, such that the substantially planar leading edge member 30 and the scoop member 40 can be optimized for its own function. The scoop member 40 and the substantially planar leading edge member 30 can be inclined aft at an angle, between about 0 degrees to about 60 degrees and generally about 33 degrees aft, with respect to the longitudinal axis of the tubular member.

The system 110, as shown in FIG. 7, is omni-directional and it operates equally well under winds from any direction. Furthermore, the tubular member 20 can be structurally fixed in one position for increased strength. In an alternative arrangement, the leading edge and scoop can be fixed while the tubular member can be canted and rotatable to provide a drawtube which is convertible to two opposite directions.

In an alternative embodiment, such as the embodiments of FIGS. 1 and 4, the entire drawtube 10, 300 including the tubular member(s) 20, the substantially planar leading edge member 30, and the optional scoop member 40 are rotatable. The drawtube 10, 300 rotates utilizing a set of bearings centered on the longitudinal axis. The drawtube 10, 300 can be motorized to face into the wind, or, alternatively, the center of the aerodynamic pressure could be placed aft of the pivot points.

In another embodiment, as shown in FIGS. 8A and 8B, the system can be transformed, through sliding or rotating panels. FIG. 8A shows a stylized system 410 composed of a plurality of sliding panels 130, 140 mounted on the sides of a rectangular, tubular member 120 or the multiple-sided approximation of a cylinder. As the wind direction changes, the sliding panels 130, 140 slide up or down, as shown in FIG. 8B to form the substantially planar leading edge member 130 and the scoop member 140. This system is also omni-directional. These alternate embodiments are not meant to be all inclusive, but are intended to show that many other manifestations of the basic design are possible and practical without changing the process as described in this application.

Embedded Drawtubes

Figure 9:
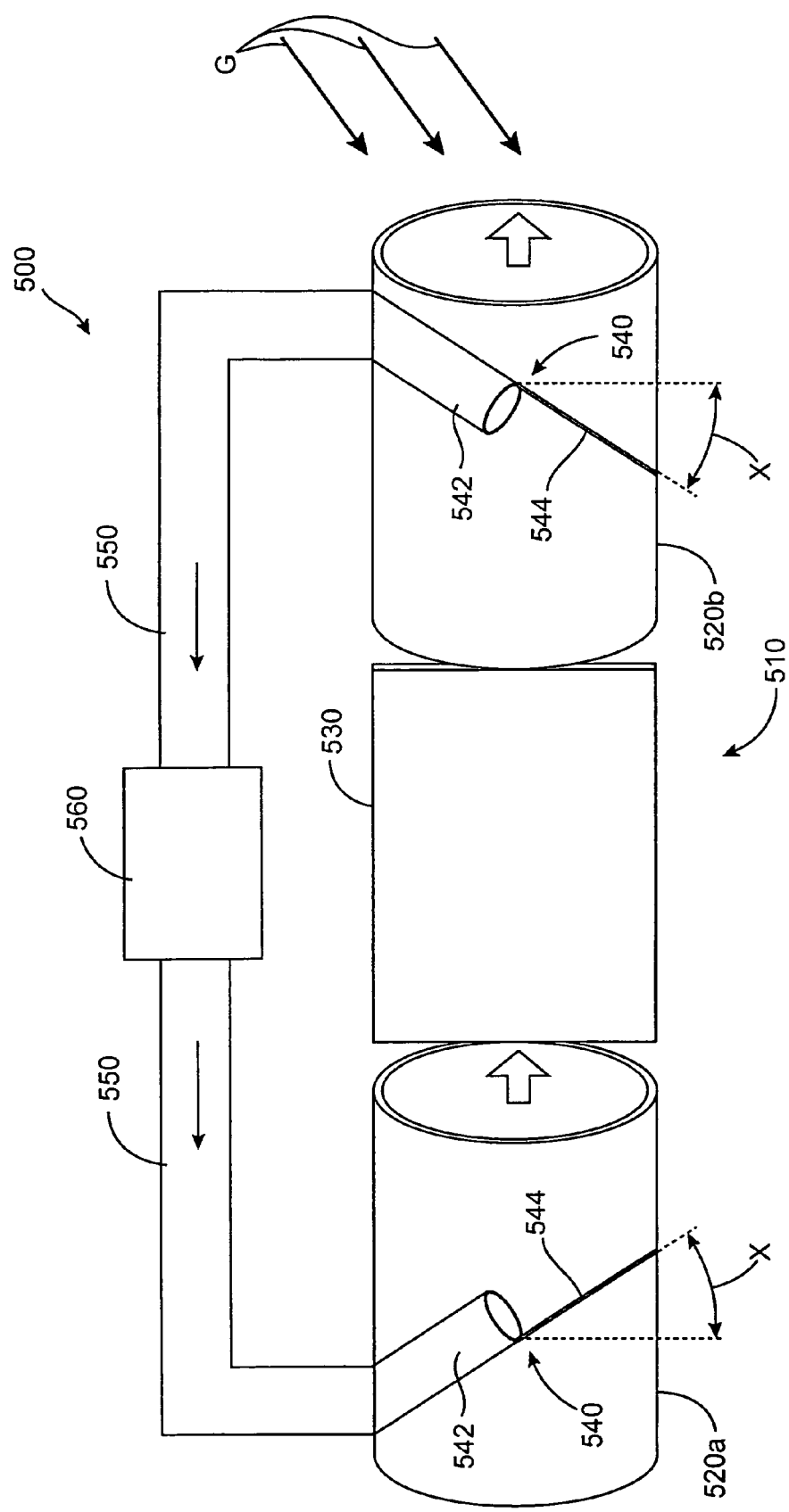
FIG. 9 is a perspective view of a system with embedded simple drawtubes according to one embodiment of the present invention.

FIG. 9 shows an alternative embodiment of a system 500 for collecting energy from wind in the form of an embedded drawtube in which one or more embedded inner drawtubes are positioned within the tubular members, or plenum, of an outer drawtube, or system. An embedded drawtube may include either a simple or compound drawtube or an array of simple or compound drawtubes that are actually placed inside the tubular member of a larger drawtube or system. The embedded drawtubes are installed in place of the energy conversion device in the tubular members of the larger system. This additional level of energy collection and concentration can be used where the primary, or larger stage, drawtubes or array of drawtubes can be constructed inexpensively. The embedded drawtube system yields doubly reduced static air pressures which, when compared to the outside static pressure, or especially an increased outside static pressure through the use of a scoop, will drive a smaller energy conversion device within the secondary embedded drawtube system at a much higher energy level.

The embedded drawtube system 500 of FIG. 9 includes a compound drawtube 510 having two tubular members 520a, 520b and a leading edge/scoop 530. The primary drawtube 510 is constructed in this example as a bidirectional drawtube in which one of the tubular members 520a operates with the leading edge 530 with the wind direction out of the page as shown by the arrows G. When the wind is out of the page, the other tubular member 520b operates with the scoop 530 to generate airflow through the tubular member 520b in the direction shown. When the wind is reversed, the airflow through the tubular members 520a, 520b is also reversed. The embedded drawtubes 540 illustrated in FIG. 9 are the simple drawtubes of FIG. 1 and are placed across the airflow, or across the axis of the tubular members 520a, 520b. The inner drawtubes 540 may also be any of the compound drawtubes or drawtube arrays discussed above. The inner drawtubes 540 each include a planar leading edge/scoop 544 and a tubular member 542. The tubular member 542 is connected by an air passageway 550 to an energy conversion device 560.

The inner drawtubes 540 in the embedded drawtube system 500 have a small air plenum diameter and high pressure differential which allows the use of certain energy conversion devices 560 such as jet pumps which may not be possible at larger diameters and smaller pressure differentials. The use of a jet pump as an energy conversion device 560 is particularly beneficial as they have no moving parts and can be made to convert a bidirectional airflow to a unidirectional product airflow. The energy of a jet pump may be used directly to power a remote air conditioner, water pump, or other pneumatic device. In the embodiment of FIG. 9, the embedded drawtubes 540 are canted at an angle X with respect to a line perpendicular to the axis of the primary tubular member 520. Alternatively, the embedded drawtubes 540 can have a planar leading edge 544 which may be canted at the angle X. As described above, the angle of canting may be about 0 to about 45 degrees and is preferably about 33 degrees.

The primary drawtube 510 produces a high energy airflow through the interaction of both high and low pressure regions when the drawtube is placed within an airflow. The embedded secondary drawtubes 540 produce a volume of air with a static pressure reduced even further than the static pressure available within the air plenum of the primary drawtube. The smaller, secondary drawtube 540, once placed within the primary air plenum, receives an enhanced airflow possessing up to about five times the energy density of the outside air stream. Since the system efficacy increases with the apparent wind speed, the embedded or secondary drawtube 540 creates an additional deep static pressure reduction. When this is compared to the outside ambient air, a twofold reduction is realized. This, in turn, creates increased airflow within the secondary air plenum.

An energy conversion device as shown and described herein, can be inserted within the tubular member 542 of the embedded drawtube 540 or remote from the system as shown in FIG. 9.

The primary drawtube 510 and embedded drawtube 540 preferably have an aspect ratio of about 6:1 as described above. In one embodiment, the length to diameter restriction, coupled with the preferred leading edge aft inclination of about 33 degrees, leads to an embedded secondary drawtube 540 having a diameter of $5/24$ of, or 0.2083 times the diameter of the primary drawtube 510. The internal area of the embedded secondary drawtube 540 would, in this embodiment, be about $1/23$ of the internal area of the primary drawtube 510.

It can be appreciated that the design tradeoff for embedding drawtubes depends on the cost of construction, the characterization of available propellers and generators, and the time weighted average of the expected wind regime.

If, for instance, an array of primary drawtubes can be constructed inexpensively, embedded secondary drawtubes can be effectively inserted. The added benefits are that smaller diameter collection plenums and energy conversion devices can also be used. Also, the embedded secondary drawtubes 540 are in a more controlled environment, with winds always approaching at a preferred or correct angle. Although primary and secondary drawtubes are shown, a system may include tertiary or additional embedded drawtubes inserted inside the secondary drawtubes.

Figure 10:
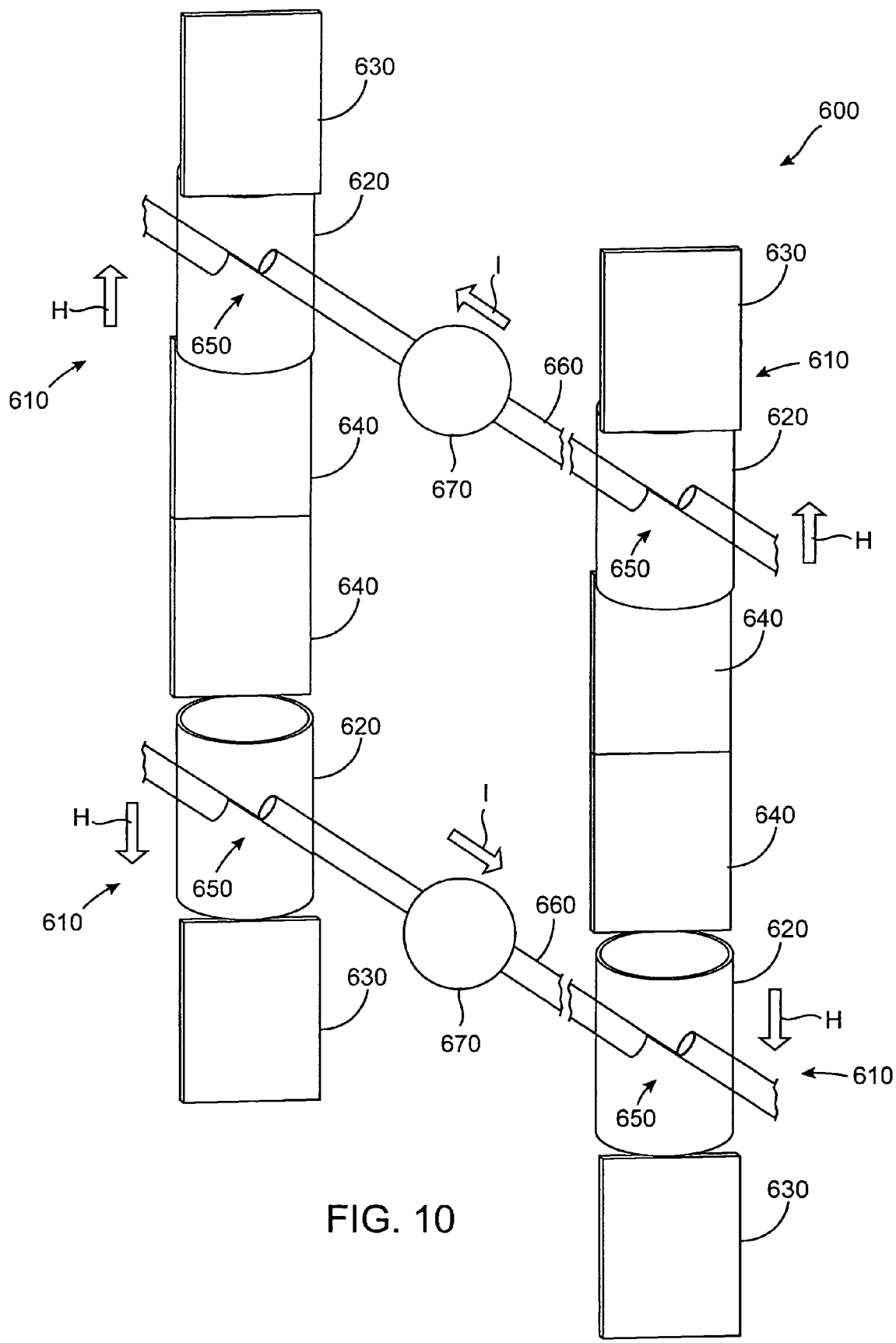
FIG. 10 is a perspective view of a system including an array of primary compound drawtubes with embedded compound drawtubes according to an alternative embodiment of the present invention.

FIG. 10 shows a modular unit or system 600 for collecting energy from the wind having embedded drawtubes. As shown in FIG. 10, each vertical row contains two larger, or primary, compound drawtubes 610. The drawtubes 610 each include a tubular member 620, a leading edge 630, and a scoop 640. The drawtubes 610 are arranged such they share a common the scoop member 640. Within each of the primary tubular members 620 is an embedded compound drawtube 650 of the type illustrated in FIG. 3. However, other embedded drawtube embodiments, or arrays of embedded drawtubes may be used. The two vertical rows of the modular units are staggered vertically, so that a preferred 33-degree inclination is achieved when embedded drawtubes 650 are connected via the secondary air plenums 660 to the energy conversion devices 670.

Of course, the energy conversion device 670 could assume many forms, within or outside the embedded drawtubes 650. Since the two primary compound drawtubes 610 in a vertical row face in opposite directions, the airflow within each primary drawtube 610 is also in opposite directions as shown by the arrows H. This causes the flow in each embedded drawtube 650 to flow in opposite directions as well with the flow through the secondary air plenums 660 in the direction of the arrows I.

As shown in FIG. 10, it is assumed that the wind is moving toward the module from the direction of the observer. Therefore, the substantially planar leading edge member 630 is positioned forward and the scoop member 640 is positioned aft. If the wind reversed directions, the internal flows would reverse and the substantially planar leading edge member 630 and the scoop member 640 would reverse roles as well as the leading edges of the embedded drawtubes 650.

Also, an array of this type can be assembled using one or more of these modules, with additional modules added either vertically or horizontally, or both. The module can be constructed so that two functional modules could be simply plugged together. As previously mentioned, other types of arrays, embedded or not, such as those presented in this application, are both practical and possible.

The drawtube arrays illustrated are merely a few examples of the types of arrays which are possible. The drawtube arrays may be connected such that a plurality of drawtubes are connected to a single air passageway for connection to one or more remote energy conversion devices. For example, a plurality of drawtubes of FIGS. 1, 2, 3 or 4 arranged horizontally, one above the other, may be interconnected by a pair of vertically oriented air plenums formed at the ends of the arrays.

Figure 11:
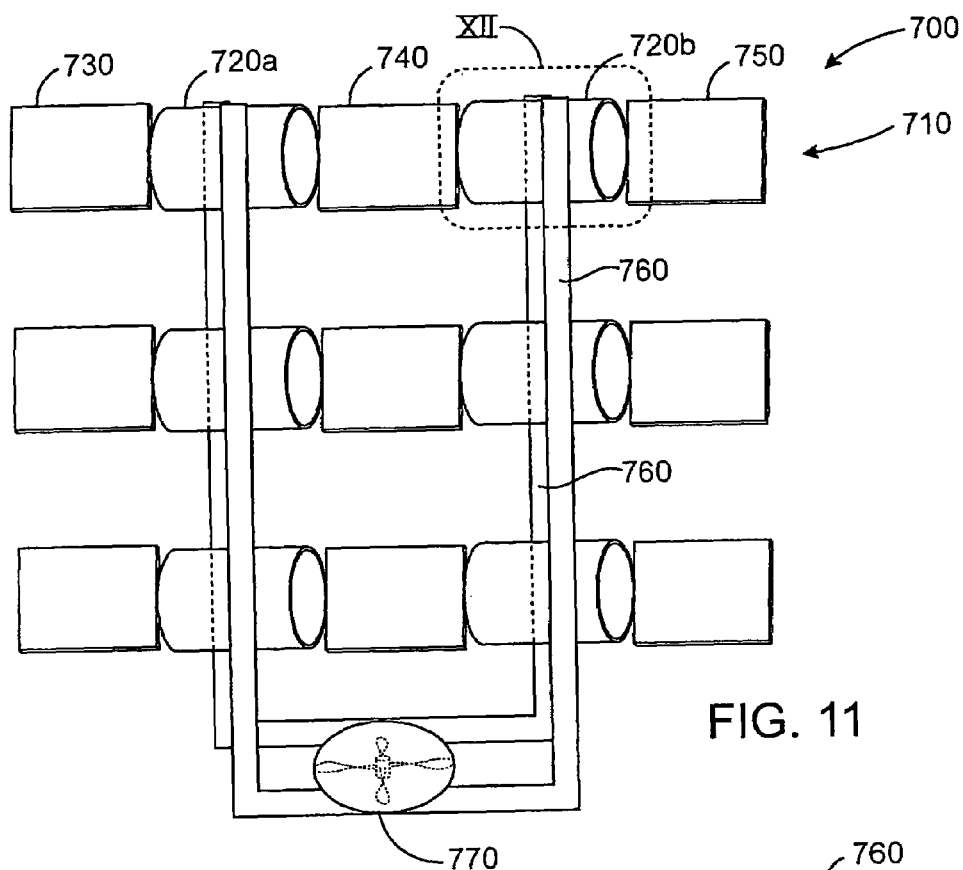
FIG. 11 is a side view of a system including an array of primary compound drawtubes with embedded compound drawtubes and a single energy conversion device.
Figure 12:
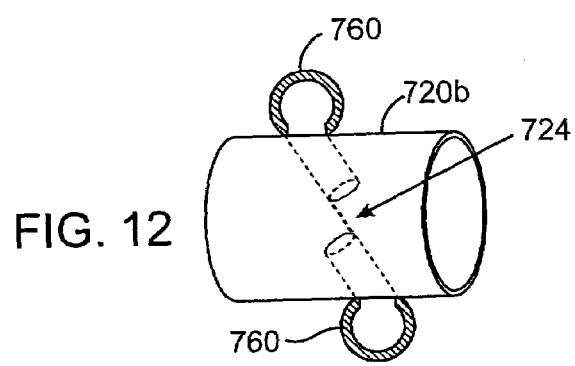
FIG. 12 is a top view of one of the primary tubular members of FIG. 11 with an embedded compound drawtube.
Figure 13:
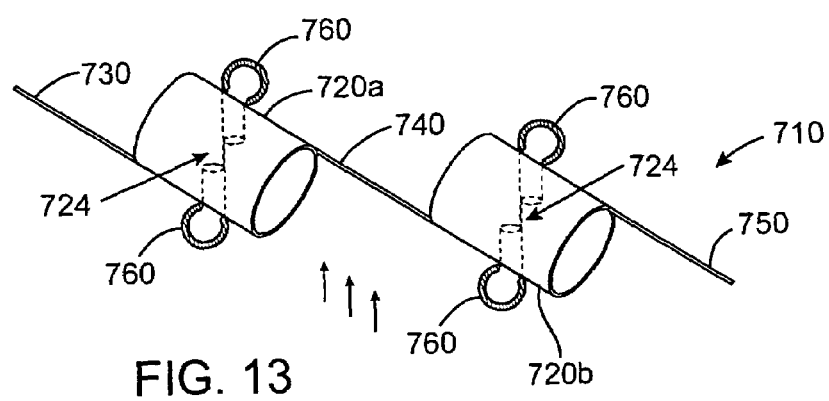
FIG. 13 is a top view of the system of FIG. 11.

FIG. 11 illustrates a system 700 of compound drawtubes 710 where each of the compound drawtubes is arranged with two or more tubular members 720a, 720b and three or more leading edge/scoop members 730, 740, 750. The tubular members 720a, 720b and planar members 730, 740, 750 are arranged in a staggered arrangement as illustrated in the top view of FIG. 13. As shown in FIG. 12, each of the tubular members 720a, 720b contains one or more compound drawtubes 724 positioned at an angle within the tubular member as described in further detail in the embodiment of FIG. 10. The ends of these embedded compound drawtubes 724 are connected to air passageways 760 (see FIG. 11) which run vertically along the sides of the tubular members 720a, 720b. The air passageways 760 connect the embedded drawtubes 724 to an energy conversion device 770 which may be positioned below the array 700, either on the ground or underground. In the configuration of FIG. 11, the air passageways on one side of the array will have an airflow in one direction, while the air passageways on an opposite side of the array will have an airflow in an opposite direction.

While the invention has been described in detail with reference to the preferred embodiments thereof, it will be apparent to one skilled in the art that various changes and modifications can be made and equivalents employed, without departing from the present invention.

The invention claimed is:

1. A system for converting an airflow into mechanical or electrical energy comprising:
   a tubular member, the tubular member having a first opening and a second opening, the first and second openings formed in two planes substantially perpendicular to a longitudinal axis of the tubular member;
   a leading edge member positioned on a windward side of the first opening; and
   an energy conversion device configured to convert an airflow through the tubular member into mechanical or electrical energy.

2. The system of claim 1, wherein the leading edge member is in a plane which is substantially parallel to the longitudinal axis of the tubular member.

3. The system of claim 1, wherein the tubular member has a circular cross-section.

4. The system of claim 1, wherein the leading edge member has a width which is about equal to or less than a diameter of the tubular member.

5. The system of claim 1, wherein the energy conversion device is a turbine.

6. The system of claim 1, wherein the leading edge has a curved surface.

7. The system of claim 1, wherein the leading edge has an angled surface.

8. A system for converting an airflow into mechanical or electrical energy comprising:
   a drawtube, the drawtube comprising:
      a tubular member with a circular cross-section, the tubular member having a first opening and a second opening, the first and second openings formed in two planes substantially perpendicular to a longitudinal axis of the tubular member; and
      a leading edge member positioned on a windward side of the first opening;
      and a scoop member positioned on an opposite side of the second opening from the leading edge member, wherein the leading edge member and the scoop member are in two planes which are substantially parallel to the longitudinal axis of the tubular member; and
   an energy conversion device configured to convert an airflow through the tubular member into mechanical or electrical energy.

9. The system of claim 8, wherein the leading edge member has a width which is about equal to or less than a diameter of the tubular member.

10. The system of claim 8, wherein the scoop member has a width which is about equal to or less than a diameter of the tubular member.

11. The system of claim 8, further comprising a means for positioning the drawtube into the airflow, wherein the leading edge member is facing substantially into the airflow.

12. The system of claim 8, wherein the drawtube is canted away from the airflow at an angle of about 0 to about 45 degrees with a free end of the leading edge member positioned aft and a free end of the scoop positioned forward.

13. The system comprising a plurality of the drawtubes of claim 8, wherein the plurality of drawtubes are assembled in an array of two or more drawtubes.

14. The system of claim 8, wherein a plurality of the leading edge members are positioned at an angle of between about 25 to 40 degrees to one another.

15. The system of claim 8, further comprising a support structure for rotatably supporting the drawtube, the support structure orienting the drawtube so that the substantially planar leading edge member is facing into the airflow.

16. The system of claim 8, further comprising a support structure for rotatably supporting the leading edge member and the scoop so that the leading edge member is facing into the airflow.

17. The system of claim 8, wherein the energy conversion device is positioned within the tubular member.

18. The system of claim 8, wherein the energy conversion device is positioned outside the tubular member and is connected to the tubular member by an air passageway.

19. The system of claim 8, wherein the leading edge has a curved surface.

20. The system of claim 8, wherein the leading edge has an angled surface.

21. The system of claim 8, wherein the scoop member has a curved surface.

22. A system for converting wind into mechanical or electrical energy, the system comprising:
   a drawtube comprising:
      a tubular member having a longitudinal axis, an inside, an outside, a first open end and a second open end; and
      a leading edge positioned adjacent to the outside of the first open end of the tubular member configured to create a pressure differential within the tubular member when wind blows past the drawtube generating an airflow within the tubular member, the leading edge having a curved surface; and
      an energy conversion device configured to convert the airflow through the tubular member into mechanical or electrical energy.

23. The system of claim 22, further comprising a support structure for rotatably supporting the drawtube, the support structure orienting the drawtube so that the leading edge is faced into the wind.

24. The system of claim 22, further comprising an airflow direction sensor and a motor for rotating the drawtube in response to the airflow direction sensor.

25. The system of claim 22, wherein the leading edge member is in a plane which is substantially parallel to the longitudinal axis of the tubular member.

26. The system of claim 22, further comprising an embedded drawtube with an inner tubular member and an inner leading edge within the tubular member and located with a longitudinal axis of the embedded drawtube positioned across an axis of the tubular member.

27. A method for collecting wind energy comprising:
   providing a drawtube comprising a tubular member having a pair of openings extending perpendicular to a longitudinal axis of the tubular member and a leading edge member positioned in front of one of the openings;
   positioning the drawtube in the wind with the leading edge member facing into the wind;
   passing wind around the leading edge member, the airflow creating eddies in and around the tubular member and the leading edge member;
   creating an airflow within the tubular member; and
   converting the airflow to mechanical or electrical energy.

28. The method of claim 27, further comprising positioning a scoop member in back of a second opening of the pair of openings.

29. The method of claim 27, further comprising assembling a plurality of drawtubes in an array of at least two drawtubes.

30. The method of claim 27, further comprising canting the drawtube away from the wind at an angle of about 0 to about 45 degrees with a free end of the leading edge member positioned aft of a forward edge of the tubular member.

31. The method of claim 27, further comprising positioning the drawtube on a support structure for rotatably supporting the drawtube, the support structure orienting the drawtube so that the substantially planar leading edge member is facing into the wind.

* * * * *